US011605201B2

(12) United States Patent
Ichim et al.

(10) Patent No.: US 11,605,201 B2
(45) Date of Patent: Mar. 14, 2023

(54) SYSTEMS, METHODS, AND MEDIA FOR DETECTING OBJECT-FREE SPACE

(71) Applicant: Meta Platforms Technologies, LLC, Menlo Park, CA (US)

(72) Inventors: Alexandru-Eugen Ichim, Zurich (CH); Matthew James Alderman, Redmond, WA (US); Alexander Sorkine Hornung, Zurich (CH); Manuel Werlberger, Zurich (CH); Gaurav Chaurasia, Zurich (CH); Jan Oberländer, Binningen (CH)

(73) Assignee: Meta Platforms Technologies, LLC, Menlo Park, CA (US)

( * ) Notice: Subject to any disclaimer, the term of this patent is extended or adjusted under 35 U.S.C. 154(b) by 12 days.

(21) Appl. No.: 16/773,886

(22) Filed: Jan. 27, 2020

(65) Prior Publication Data

US 2021/0233311 A1 Jul. 29, 2021

(51) Int. Cl.
*G06T 19/00* (2011.01)
*G06T 7/593* (2017.01)

(52) U.S. Cl.
CPC ............ *G06T 19/003* (2013.01); *G06T 7/593* (2017.01); *G06T 2207/10012* (2013.01)

(58) Field of Classification Search
CPC ....... G06T 19/003; G06T 19/20; G06T 7/593; G06T 2207/10012
See application file for complete search history.

(56) References Cited

U.S. PATENT DOCUMENTS

| 10,535,199 | B1 | 1/2020 | Bond | |
|---|---|---|---|---|
| 2008/0197702 | A1* | 8/2008 | Banach | H02G 3/0493 307/11 |
| 2017/0270711 | A1* | 9/2017 | Schoenberg | G06T 19/006 |
| 2018/0012370 | A1* | 1/2018 | Aghamohammadi | G06T 7/50 |
| 2019/0043259 | A1* | 2/2019 | Wang | G06F 3/012 |
| 2019/0384302 | A1* | 12/2019 | Silva | G05D 1/0088 |
| 2020/0305258 | A1* | 9/2020 | Zhao | G06V 40/103 |

OTHER PUBLICATIONS

International Search Report and Written Opinion for International Application No. PCT/US2020/067051, dated Apr. 16, 2021.
Cheng, et al., VRoamer: Generating On-The-Fly VR Experiences While Walking Inside Large, Unknown Real-World Building Environments, Microsoft Research Redmond, 8 pages, 2019.
(Continued)

*Primary Examiner* — Michelle Chin
(74) *Attorney, Agent, or Firm* — Baker Botts L.L.P.

(57) ABSTRACT

In particular embodiments, a computing system may divide at least a portion of a physical space surrounding a user into a plurality of three-dimensional (3D) regions, wherein each of the 3D regions is associated with an area of a plurality of areas in a plane. The system may generate estimated locations of features of objects in the portion of the physical space. Based on the estimated locations, the system may determine an occupancy state of each of the plurality of 3D regions. Then based on the occupancy states of the plurality of 3D regions, the system may determine that one or more of the plurality of areas have respective airspaces that are likely unoccupied by objects.

20 Claims, 9 Drawing Sheets

(56) References Cited

OTHER PUBLICATIONS

Keller, et al., Game Room Map Integration in Virtual Environments for Free Walking, 2018 IEEE Conference on Virtual Reality And 3d User Interfaces (VR), Mar. 18, 2018, Reutlingen, Germany, pp. 763-764.
Hirt, et al., Geometry Extraction for Ad Hoc Redirected Walking Using a SLAM Device, AVR 2018, LNCS 10850, pp. 35-53.

* cited by examiner

SYSTEMS, METHODS, AND MEDIA FOR DETECTING OBJECT-FREE SPACE

TECHNICAL FIELD

This disclosure generally relates to computer vision.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in artificial reality and/or used in (e.g., perform activities in) an artificial reality. Artificial reality systems that provide artificial reality content may be implemented on various platforms, including a head-mounted device (HMD) connected to a host computer system, a standalone HMD, a mobile device or computing system, or any other hardware platform capable of providing artificial reality content to one or more viewers.

When a user is wearing an HMD, his vision of the physical environment is occluded by the physical structure of the HMD. For example, the displays of the HMD could be positioned directly in front of and in close proximity to the user's eyes, thereby blocking his vision of the physical environment. Even though the user may not be able to directly see his physical surroundings, he is able to see the content displayed by the HMD and may be expected to move around. For example, certain artificial reality applications, such as games or virtual worlds, may ask the user to walk around, turn, dodge, swing his arms, crawl, etc. However, since the user's vision is blocked by the HMD, he would be unable to see the physical environment and avoid colliding with physical objects while moving.

SUMMARY OF PARTICULAR EMBODIMENTS

Embodiments described herein pertain to systems, methods, and media configured to automatically determine an object-free space in the physical environment around a user. In particular embodiments, an artificial reality system may determine, with reasonable confidence, which spatial regions in the physical environment surrounding the user is likely occupied by a physical object. The HMD may have a pair of external-facing cameras configured to capture stereo images. Using the stereo images, the system could compute the depths of observable features in the scene. The computed depths of features may be represented as a point cloud in 3D space, with each point representing a location of a particular observed feature. The point cloud, however, may have significant noise, so additional processing may be needed to determine whether a point truly corresponds to a physical object. To do so, particular embodiments may divide the physical space into voxels. For each point within a voxel, the voxel may receive a vote of being "occupied" by a physical object. In addition, rays may be cast from the user or the HMD's viewpoint towards each point in the point cloud. Except for the voxel containing the point to which the ray is cast, each voxel intersected by the ray would receive a vote of "free" to indicate that it is likely empty. Other voxels that do not contain any point and are not intersected by any ray may have a status of "unknown." After this process is complete, the system could use the votes tallied for each voxel to determine the likelihood of the voxel being occupied by physical objects.

In particular embodiments, the system may generate a two-dimensional definition of object-free areas based on the occupancy states of the voxels. In particular embodiments, the system may detect the ground plane and take into consideration the voxels above a threshold minimum height above that plane. This may be done to filter out voxels that may be erroneously deemed "occupied" due to observed features of the floor, carpets, or mats, which could be noisy due to their lack of distinct, trackable features. The system may also filter out voxels that are above a threshold maximum height since the user is unlikely to enter the airspace corresponding to those voxels and features of the ceiling, similar to the floor, could be noisy. The voxels within the minimum and maximum height thresholds could then be used to determine 2D areas where the user may safely navigate.

In particular embodiments, the 2D object-free areas may be determined by projecting the occupancy information associated with the voxels down to a 2D plane. For example, each column of voxels may be associated with an area within the 2D plane (e.g., the area may correspond to the ground on which the column of voxels are stacked). If the column of voxels contains any voxel that is deemed to be "occupied," then the corresponding area would be marked as "occupied" as well. If the column does not contain any "occupied" voxel, then the corresponding area may be marked according to the number of free voxels in the column. For example, even if some of the voxels in the column are "unknown," the area associated with the column may nevertheless be deemed to be "free" if there is a significant number of "free" voxels in the column. If there the number of "free" voxels falls short, the area may be deemed "unknown." When complete, the system would know which areas are likely occupied, which are likely free, and which are likely unknown. The 2D areas may be used to define an object-free space in which the user may safely navigate. In particular embodiments, the system may generate a 3D boundary that extends from the floor to the ceiling according to the object free space. This 3D boundary may be used to warn the user when he is about to exit the boundary or when objects intrude into the boundary. In particular embodiments, the 2D areas may be determined by the operating system of the artificial reality device and provided to applications, which may use the 2D areas to procedurally generate content (e.g., a walkway or path).

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system, and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Particular embodiments described herein may automatically determine object-free areas. Such a feature may be particularly useful in the context of artificial reality, where the user's view of the physical environment may be blocked by an HMD. Thus, when the user is wearing an HMD and moving about, he runs the risk of colliding with objects in the physical world, such as furniture or another person.

Figure 1:
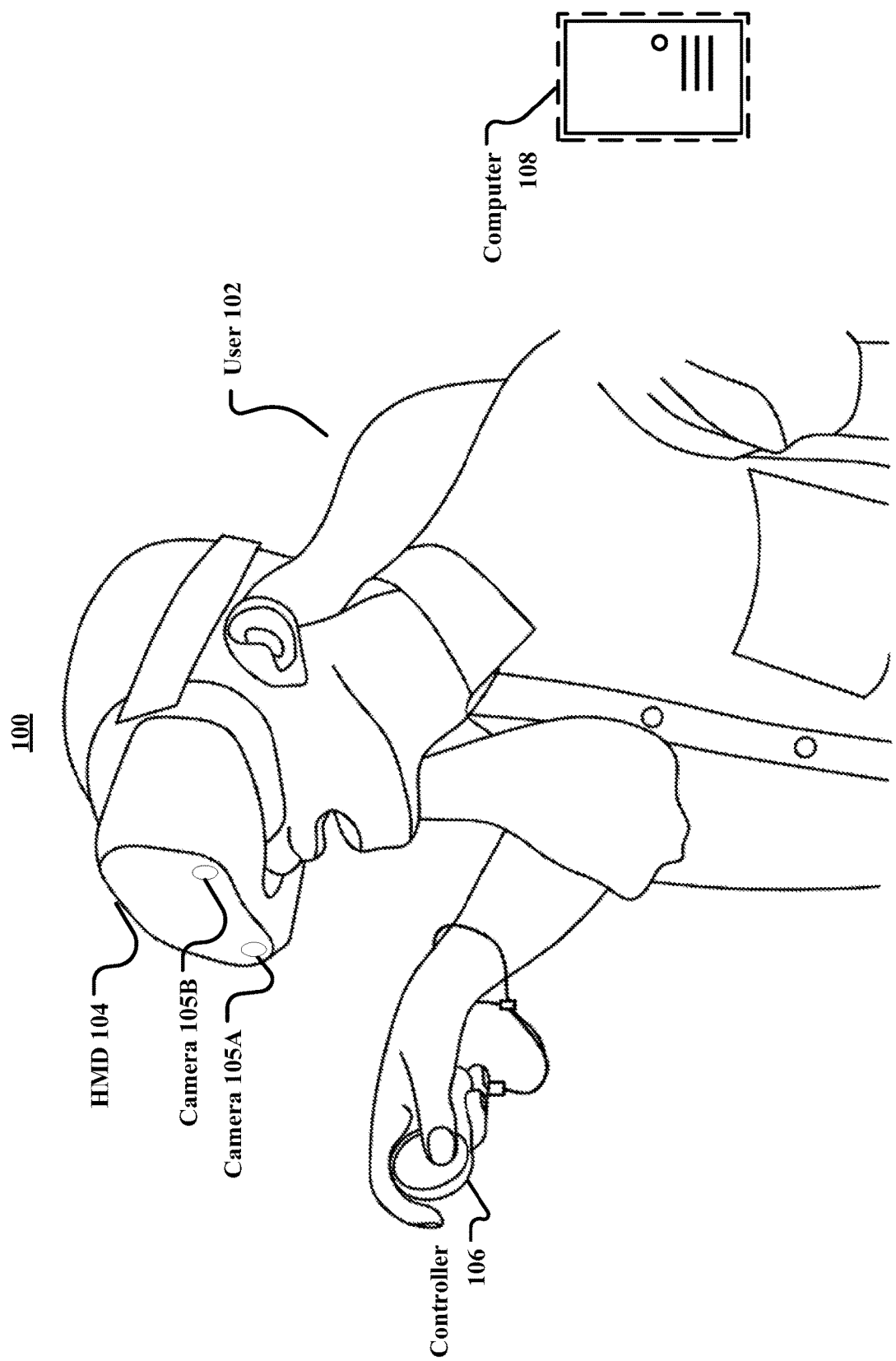
FIG. 1 illustrates an example of an artificial reality system worn by a user, in accordance with particular embodiments.

FIG. 1 illustrates an example of an artificial reality system 100 worn by a user 102. In particular embodiments, the artificial reality system 100 may comprise a head-mounted device ("HMD") 104, a controller 106, and a computing system 108. The HMD 104 may be worn over the user's eyes and provide visual content to the user 102 through internal displays (not shown). The HMD 104 may have two separate internal displays, one for each eye of the user 102. As illustrated in FIG. 1, the HMD 104 may completely cover the user's field of view. By being the exclusive provider of visual information to the user 102, the HMD 104 achieves the goal of providing an immersive artificial-reality experience. One consequence of this, however, is that the user 102 would not be able to see the physical environment surrounding him, as his vision is shielded by the HMD 104.

The HMD 104 may have external-facing cameras, such as the two forward-facing cameras 105A and 105B shown in FIG. 1. While only two forward-facing cameras 105A-B are shown, the HMD 104 may have any number of cameras facing any direction (e.g., an upward-facing camera to capture the ceiling or room lighting, a downward-facing camera to capture a portion of the user's face and/or body, a backward-facing camera to capture a portion of what's behind the user, and/or an internal camera for capturing the user's eye gaze for eye-tracking purposes). The external-facing cameras are configured to capture the physical environment around the user and may do so continuously to generate a sequence of frames (e.g., as a video). The captured images may be used to estimate the depth of physical objects observed by the cameras 105A-B. Depth may be measured in a variety of ways. In particular embodiments, depth may be computed based on stereo images. For example, the two forward-facing cameras 105A-B may share an overlapping field of view and be configured to capture images simultaneously. As a result, the same physical object may be captured by both cameras 105A-B at the same time. For example, a particular feature of an object may appear at one pixel $p_A$ in the image captured by camera 105A, and the same feature may appear at another pixel $p_B$ in the image captured by camera 105B. As long as the depth measurement system knows that the two pixels correspond to the same feature, it could use triangulation techniques to compute the depth of the observed feature. For example, based on the camera 105A's position within a 3D space and the pixel location of $p_A$ relative to the camera 105A's field of view, a line could be projected from the camera 105A and through the pixel $p_A$. A similar line could be projected from the other camera 105B and through the pixel $p_B$. Since both pixels are supposed to correspond to the same physical feature, the two lines should intersect. The two intersecting lines and an imaginary line drawn between the two cameras 105A and 105B form a triangle, which could be used to compute the distance of the observed feature from either camera 105A or 105B or a point in space where the observed feature is located.

In particular embodiments, the pose (e.g., position and orientation) of the HMD 104 within the environment may be needed to properly orient the observed features within a 3D space. For example, after determining the location of a corner of a table relative to the HMD, the system 100 would need to determine the location of the table relative to a global coordinate system representing the physical space. Based on the pose of the HMD within the global coordinate and the relative depth measurement of the corner of the table to the HMD, the system 100 may place the observed corner of the table within the global coordinate. In particular embodiments, the HMD 104 may be equipped with inertial-measurement units ("IMU"). The data generated by the IMU, along with the stereo imagery captured by the external-facing cameras 105A-B, allow the system 100 to compute the pose of the HMD 104 using, for example, SLAM (simultaneous localization and mapping) or other suitable techniques.

In particular embodiments, the artificial reality system 100 may further have one or more controllers 106 that enable the user 102 to provide inputs. The controller 106 may communicate with the HMD 104 or a separate computing unit 108 via a wireless or wired connection. The controller 106 may have any number of buttons or other mechanical input mechanisms. In addition, the controller 106 may have an IMU so that the position of the controller 106 may be tracked. The controller 106 may further be tracked based on predetermined patterns on the controller. For example, the controller 106 may have several infrared LEDs or other known observable features that collectively form a predetermined pattern. Using a sensor or camera, the system 100 may be able to capture an image of the predetermined pattern on the controller. Based on the observed orientation of those patterns, the system may compute the controller's position and orientation relative to the sensor or camera.

The artificial reality system 100 may further include a computer unit 108. The computer unit may be a stand-alone unit that is physically separate from the HMD 104 or it may be integrated with the HMD 104. In embodiments where the computer 108 is a separate unit, it may be communicatively coupled to the HMD 104 via a wireless or wired link. The computer 108 may be a high-performance device, such as a desktop or laptop, or a resource-limited device, such as a mobile phone. A high-performance device may have a dedicated GPU and a high-capacity or constant power source. A resource-limited device, on the other hand, may not have a GPU and may have limited battery capacity. As such, the algorithms that could be practically used by an artificial reality system 100 depends on the capabilities of its computer unit 108.

As previously explained, the HMD may block the user's view of his physical surroundings. To help the user avoid colliding with physical objects or persons, particular embodiments are directed to defining an object-free space in which the user can expect to be free of hazardous objects. The spatial definition of the object-free space may be mapped to the user's physical environment and used to warn the user when he is about to step outside the space or alert the user of objects that intrude into the space. For example, by using localization techniques (e.g. SLAM), the artificial reality system may detect when the user is about to move outside of the defined space and warn the user (e.g., the system may display a virtual boundary drawn using the HMD based on the boundary of the object-free space). As another example, when the system detects that a physical object, such as another person, enters the defined space, the system may generate and display a visual representation of the object to warn the user of the intruding object.

In particular embodiments, the user may manually define a safe space that is free of physical obstacles to move in. For example, when the user starts using an artificial reality device, the user may manually define a space to play in. For example, the user may point to the floor using a controller or gesture and draw a virtual boundary to define the space. However, the manual process of drawing the boundary could be tedious, especially if the desired boundary is large and/or spans multiple rooms. Moreover, the boundary drawn by the user may be inaccurate. For example, the boundary line drawn by the user may not properly account for objects within the airspace of the boundary (e.g., the user may draw a boundary along the foot of a table without accounting for the protruding face of the table). The boundary drawn may also be suboptimal, as the user may be overly conservative when drawing the boundary and fail to include all the available free space in the region.

Figure 2:
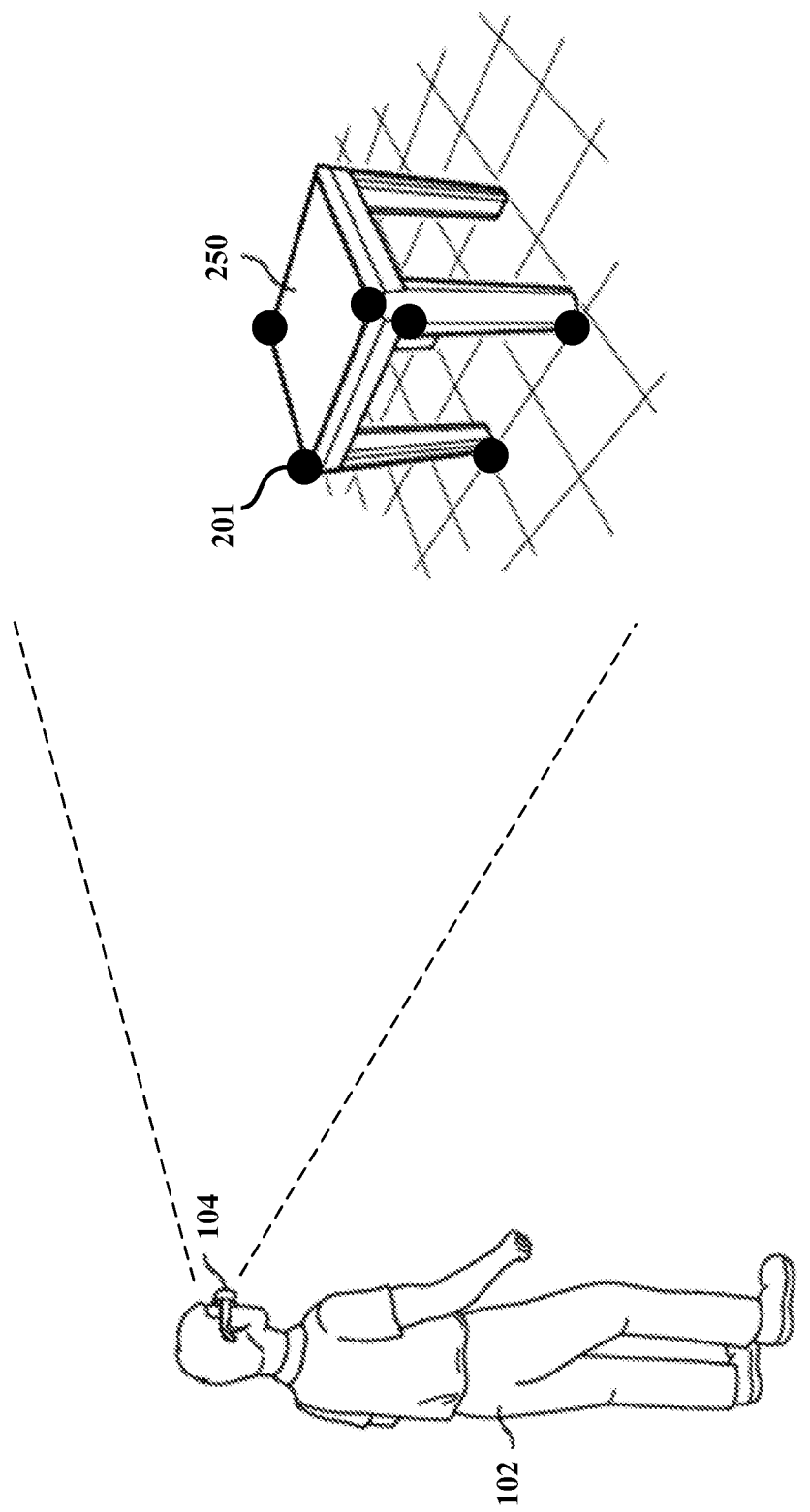
FIG. 2 illustrates an example of determining locations of observable features in a user's physical environment, in accordance with particular embodiments.

Particular embodiments described herein provide a technique for automatically determining an object-free space. FIG. 2 illustrates an example of determining locations of observable features in a user's physical environment. The figure shows a user 102 wearing an HMD 104. The HMD 104 may have external-facing cameras with overlapping fields of view. The cameras may simultaneously capture images of the user's environment, which includes a table 250. The stereo images may be used to estimate 3D information about objects in the user's environment. For example, given a pair of stereo images, the computing system of the artificial reality device may attempt to find corresponding features in the images. For example, the left corner 201 of table 250 may appear in both stereo images. The system may match features captured in one image to features captured in the other image to find features that correspond to the same objects. For example, the system may determine that the table corner 201 appears at location $(x_1, y_1)$ in the image captured by the left camera, and the same table corner 201 appears at the location $(x_2, y_2)$ in the image captured by the right camera. Once the system identifies the pixels in the two images that correspond to the same table corner 201, the system may use the known relative positions of the stereo cameras to compute the depth of the table corner 201 relative to the HMD 104. For example, the system may project a line from the left camera through the $(x_1, y_1)$ location in its screen space and project another line from the right camera through the $(x_2, y_2)$ location in its screen space. The two lines should intersect if the system correctly determined that the features correspond to the same table corner 201. Since the relative distance between the left and right cameras is also known, the system could form a triangle based on the two projected lines and a line drawn between the cameras. As such, the system could use triangulation techniques to compute the depth of the table corner 201 relative to the HMD 104 or either of the cameras. This relative depth measurement, coupled with the localization information of the HMD 104 within the environment, may be used to compute a 3D spatial location of the observed feature 201. In a similar manner, the system may compute the spatial locations of other observable features in the environment. In particular embodiments, these spatial locations of observable features may be represented as points in a point cloud.

The estimated spatial locations of features, however, may be noisy. As mentioned, the estimated spatial location of a feature may be derived from the depth estimate of the feature. The accuracy of the depth estimate, in turn, depends on the accuracy of feature detection and the correctness of the determined correspondences. Unfortunately, both feature detection and correspondence matching could be error-prone, especially for objects with non-prominent features that are difficult to track (e.g., white walls, floors, large surfaces, round objects, etc.). As such, the estimated spatial locations of features may be noisy and include false positives. If the system relies on such noisy data without scrutiny when identifying object-free spaces, the resulting object-free spaces may be inaccurate and overly conservative (in other words, it may exclude areas that are actually free of objects).

Figure 3A:
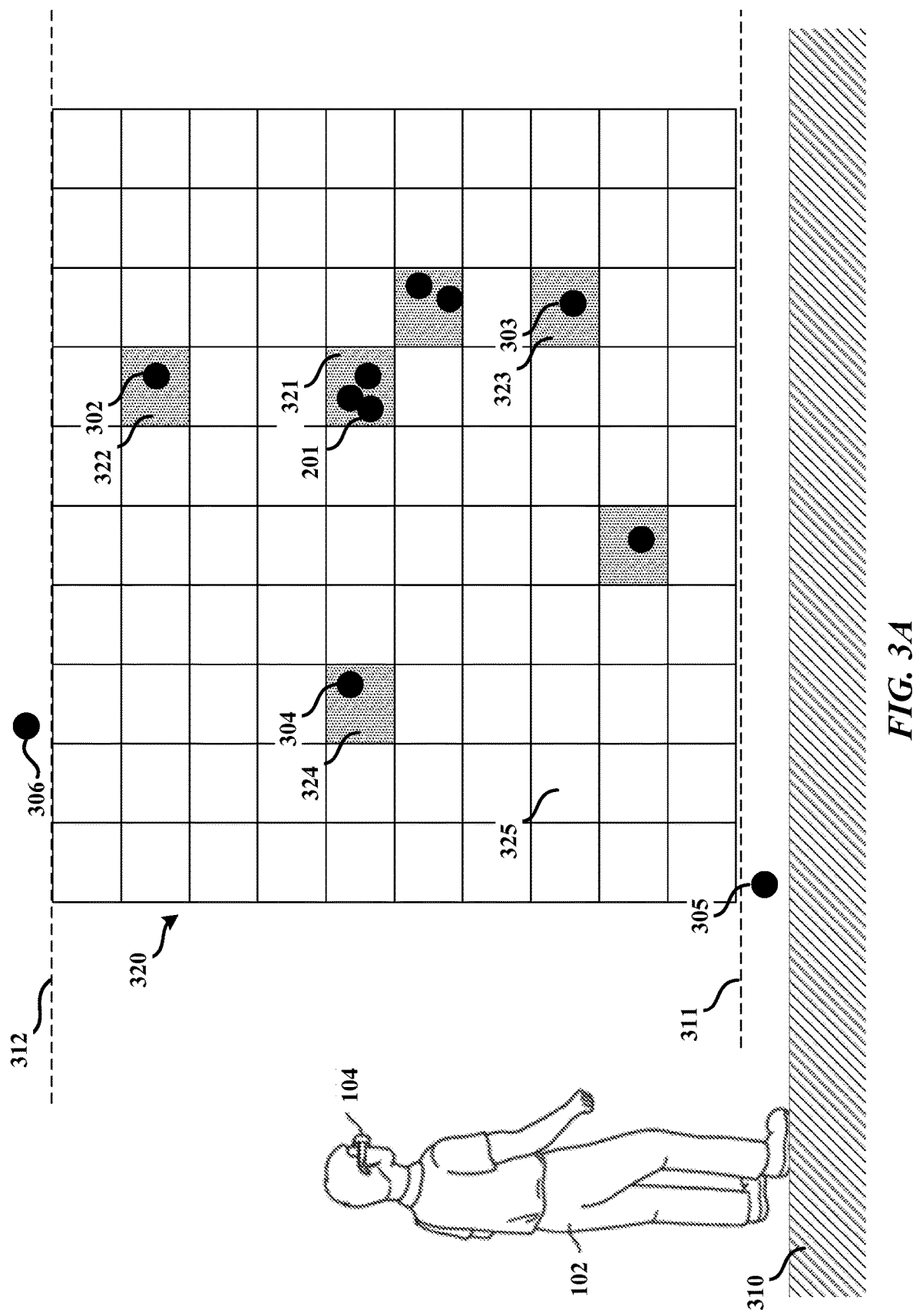
FIG. 3A illustrates an example process for assessing the likelihoods of spatial regions being occupied by physical objects, in accordance with particular embodiments.

FIG. 3A illustrates an example process for assessing the likelihood of spatial regions being occupied by physical objects. The figure shows a user 102 wearing an HMD 104 and points (e.g., 201, 302-306) in a point cloud representing estimates of feature locations. For example, point 201 corresponds to the left table corner shown in FIG. 2, and points 302-306 may correspond to other observed features. Point 304 may be a false positive, meaning that it is noise and does not actually correspond to a physical object.

In particular embodiments, the system may filter out points from particular predetermined spatial regions. For example, the system may filter out points, such as point 305, that fall within a threshold distance 311 (e.g., 2, 4, or 5 centimeters) from the floor 310. Points that are low to the ground may be filtered out for several reasons. As previously mentioned, features of large surface areas, such as floors, may be difficult to detect and error-prone. Thus, points that are close to the floor 310 are more likely to be false positives and could be safely ignored. Even for points that correspond to actual objects, they are unlikely to be hazardous to the user 102 if they are sufficiently close to the floor 310. For example, point 305 may correspond to a portion of a rug or magazine lying on the floor 310 and, therefore, would not be hazardous to the user 102. The threshold distance 311 that filters out points close to the floor 310 may be pre-determined based on empirical studies or set by the user 102. For example, the threshold distance 311 from the floor 310 may be set based on a statistical distribution of false positives near the floor 310 (e.g., the distance 311 may be set to a value under which 90% of false positives generated due to flooring features would fall).

In particular embodiments, the system may additionally or alternatively filter out points that are higher than a threshold 312. For example, the system may filter out points, such as point 306, that is above the threshold 312. Points close to the ceiling, similar to those close to the floor, may be noisy since features on the ceiling are difficult to detect. Moreover, even if a point corresponds to an actual object, the object would not pose a danger to the user if it is higher than the user's reach. For example, objects that are higher than 7 or 8 feet (e.g., a ceiling fan or lamp) would be out of the user's reach and, therefore, should not be taken into consideration when determining whether a space is safe for the user to move in. Thus, in particular embodiments, the system may filter out points that are above a certain height 312. The height 312 may be defined relative to the ceiling (e.g., 3, 5, 10, or 15 inches from the ceiling) or it could be defined relative to the floor 310 (e.g., 7, 8, or 8.7 feet).

In particular embodiments, the system may use the point cloud, which represents the locations of observed features of objects, to assess the likelihood of certain regions in space being free or occupied by physical objects. In particular embodiments, the physical space may be divided into multiple voxels 320. For simplicity, FIG. 3A shows the voxels as a 2D grid, but one of ordinary skill in the art should recognize that voxels are 3D volumetric units. Each of the voxels 320 may have predefined dimensions (e.g., a 10 cm×10 cm×10 cm cube, a 5 cm×8 cm×10 cm rectangle, etc.).

In particular embodiments, each voxel 320 may have a state of being "occupied," "free," or "unknown." A voxel 320 is deemed to be "occupied" if it is occupied by a physical object. A voxel 320 is "free" if it is not occupied by an object (in other words, the voxel 320 is free of objects). If there is insufficient information to determine whether a voxel 320 is "occupied" or "free," then its state would be "unknown." In particular embodiments, each voxel 320 may be initialized to have an "unknown state."

In particular embodiments, the point cloud may serve as evidence that particular voxels are "occupied." As shown in FIG. 3A, each point in the point cloud may be located in one of the voxels 320, and each voxel 320 may contain any number of points. For example, point 201, which corresponds to the left corner of the table shown in FIG. 2, falls in voxel 321. That particular voxel 321 contains an additional two points. Voxel 322 contains point 302, voxel 323 contains point 303, and voxel 324 contains point 304. Several other voxels, such as voxel 325, do not contain any point. In particular embodiments, each point in a voxel may count as a vote towards that voxel being "occupied" (the voxels that received at least one "occupied" vote is shaded). For example, since voxel 321 contains three points, it may receive three votes for being "occupied." Voxel 322 only contains one point 302, so it has one vote for being "occupied." Since voxel 321 has three votes compared to the single vote of voxel 322, voxel 321 is more likely to be occupied absent any counter-evidence, which will be described in further detail below. In particular embodiments, the votes received by each voxel may be aggregated. For example, if each "occupied" vote counts as +1, the vote received by voxel 321 thus far would be +3 and the votes received by voxel 324 would be +1.

Figure 3B:
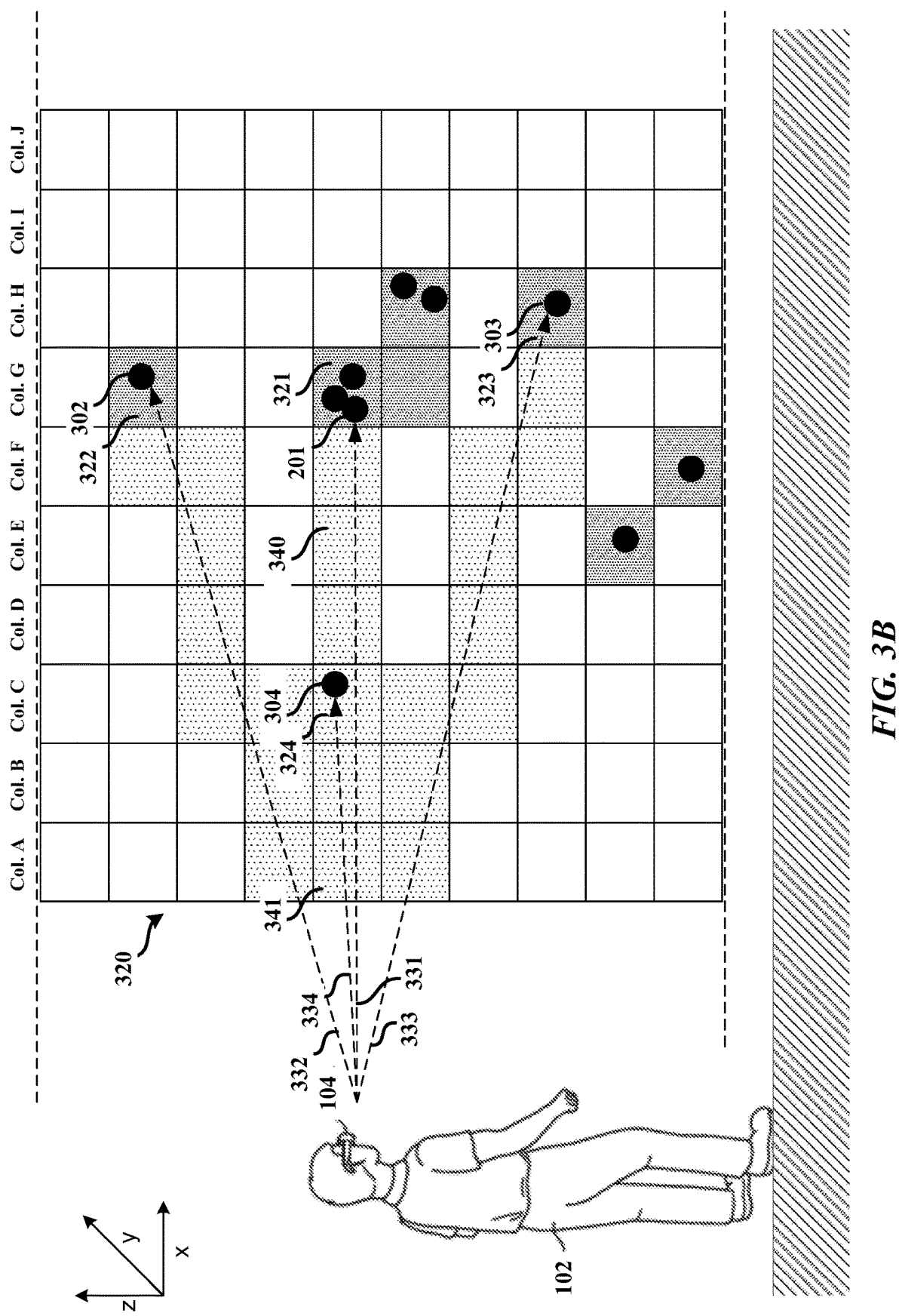
FIG. 3B illustrates an example technique for assessing the likelihoods of spatial regions being free of objects, according to particular embodiments.

In addition to being used to determine "occupied" regions, the point cloud may also be used to identify regions that are likely to be free of objects. Conceptually, if an object is visible from a particular viewpoint, the space between the object and the viewpoint should be free of objects; otherwise, the object would be occluded. FIG. 3B illustrates an example technique for assessing the likelihoods of spatial regions being free of objects, according to particular embodiments. FIG. 3B shows voxel grid 320 and several points that represent the locations of observed features (e.g., 201, 302, 303, and 304). In particular embodiments, the computing system may cast a ray towards each of the points in the point cloud. For example, FIG. 3B shows rays 331, 332, 333, and 334 being cast towards points 201, 302, 303, and 304, respectively. Each ray may intersect any number of voxels 320 before intersecting the target point. For example, ray 331 intersects six voxels before intersecting the voxel 321 that contains the target point 201. As another example, ray 334 intersects two voxels before intersecting the voxel 324 that contains the target point 304. A vote of being "free" may be assigned to each voxel intersected by a ray before the ray intersects the voxel containing its target point. For example, voxels 340 and 341 may each receive a "free" vote for being intersected by ray 331. The voxel 341 may receive an additional "free" vote for being intersected by ray 334. Thus, the voxel 341 may have two "free" votes.

In particular embodiments, the votes received by each voxel may be used to statistically determine the likelihood of it being "occupied," "free," or "unknown." For example, voxel 341 may have two "free" votes; voxel 340 may have one "free" vote; voxel 324 may have one "occupied" vote and one "free" vote (due to the ray 331); and voxel 321 may have three "occupied" votes. Any suitable rules or criteria may be applied to the votes of a voxel to determine its likely state. For example, a voxel may be deemed to be "occupied" if a majority of its votes are "occupied"; it may be deemed to be "free" if a majority of its votes are "free"; and its state may be "unknown" if the voxel received no votes or if it received an equal number of "occupied" and "free" votes.

As another example, the votes of each voxel may be aggregated to fall within a numeric range (e.g., −10 to 10; 0 to 10; negative to positive infinity, etc.), and the likely state of each voxel may be defined based on the particular subrange within which the tallied votes fall. For example, each voxel may be associated with a numeric value that tracks the relative vote count the voxel receives. The value may start off as 0, and it may increment by +1 for every "occupied" vote and decrement by −1 for every "free" vote. For example, if a voxel receives 5 "occupied" votes and 2 "free" votes, the numeric value would be 3. If the voxel instead receives 6 "occupied" votes and 8 "free" votes, the numeric value would be −2. If the numeric value of a voxel falls within the subrange of −3 to +3, the voxel may be assigned a likely state of "unknown" (in other words, there is insufficient confidence to label the voxel as "occupied" or "free"). If the numeric value is greater than +3, then the voxel may be assigned a likely state of "occupied." Conversely, if the numeric value is less than −3, then the voxel may be assigned a likely state of "free." Although this example shows subranges being symmetrical, they need not be. For example, the subranges corresponding to "free,"

"unknown," and "occupied" may be, respectively, [−10 to −5], [−5 to 2], and [2 to 10]. This asymmetrical allocation of subranges is more conservative when it comes to assigning "free" states since the requirement for the "free" state is more stringent (e.g., a "free" state requires five more "free" votes than "occupied" votes) than the requirement for the "occupied" state. The statistical rules for deciding the state of a voxel may depend on a variety of factors, including, for example, risk tolerance (e.g., preference for erring on the side of deeming a voxel as being "occupied" rather than "free"), known noise or error bias (e.g., if the point cloud of detected features has significant noise, more evidence may be required to deem a voxel as "occupied"), etc.

Figure 4:
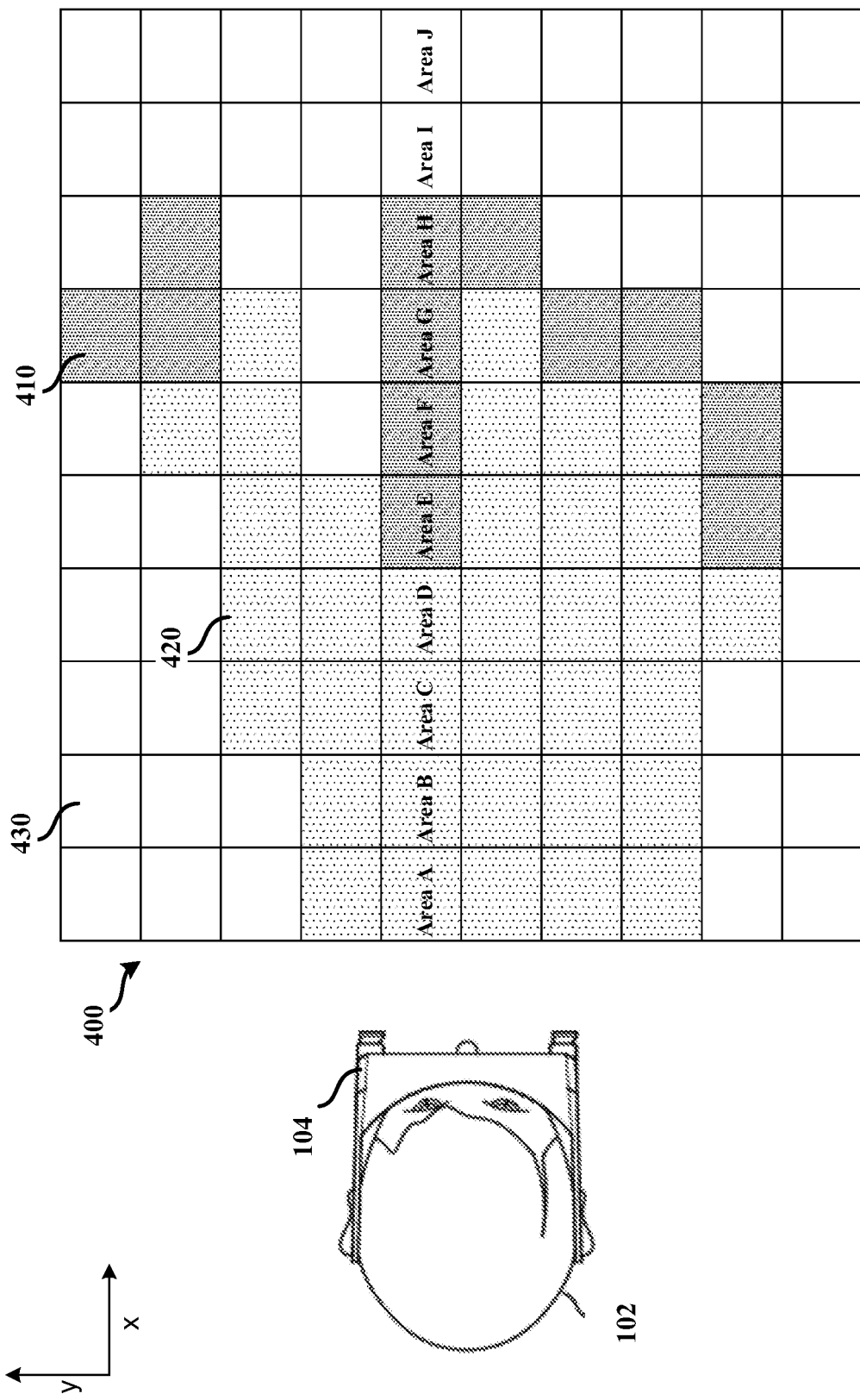
FIG. 4 illustrates an example of occupancy states of 2D areas in a plane, in accordance with particular embodiments.

In particular embodiments, after the likely occupancy states of 3D spatial regions (e.g., voxels) have been determined, they may be used to determine the occupancy states of corresponding 2D areas. FIG. 4 illustrates an example of the occupancy states of 2D areas 400 in a plane. The plane may be parallel to the ground floor, and the occupancy states of the 2D areas in the plane may be used to define a map that informs the user of free, occupied, and unknown regions. The 2D areas 400 shown in FIG. 4 may correspond to a cross-section along an x-y plane of the 3D spatial regions or voxels 320 shown in FIG. 3B. For example, Areas A to J shown in FIG. 4 may correspond to Columns A to J in FIG. 3B, respectively (e.g., Area A may be a cross-section of Column A, Area B may be a cross-section of Column B, etc.).

In particular embodiments, the occupancy state of each area 400 may be determined based on the occupancy states of the 3D spatial regions in the corresponding column. Conceptually, the occupancy state of each area 400 depends on that area's airspace. If any portion of the airspace (which may be limited to a particular height, such as the maximum height threshold 312 shown in FIG. 3A) of an area is occupied by an object, then the area is considered to be occupied and a user should take care to avoid stepping into the area. For example, since the voxels in Columns E, F, G, and H shown in FIG. 3B each has at least one "occupied" voxel (e.g., voxel 321 and 322 in Column G), the corresponding Areas E, F, G, and H are deemed to be "occupied" (occupied areas are densely shaded). For each column that contains no "occupied" voxel, the occupancy state of the corresponding area may be either "free" or "unknown." In particular embodiments, the occupancy state of such an area may be determined based on the percentage of "free" voxels in the column. For example, the occupancy state may be based on the following equation:

number of "free" voxels÷(number of "free" voxels+ number of "unknown" voxels).

For example, 30% of the voxels in Column A are "free"; 50% of the voxels in Column C are "free"; and 0% of the voxels in Column J are "free." In particular embodiments, whether or not an area is deemed "free" may be based on whether the percentage of "free" voxels in the corresponding column meets a threshold requirement. For example, if the percentage of "free" voxels is 25% or more, then the occupancy state of the area would be "free"; otherwise, the state of occupancy state would be "unknown." In FIG. 4, the darker areas, such as area 410, represent "occupied" areas; the lighter areas, such as area 420, represent "unoccupied" areas; and the white areas, such as area 430, represent "unknown" areas.

Figure 5:
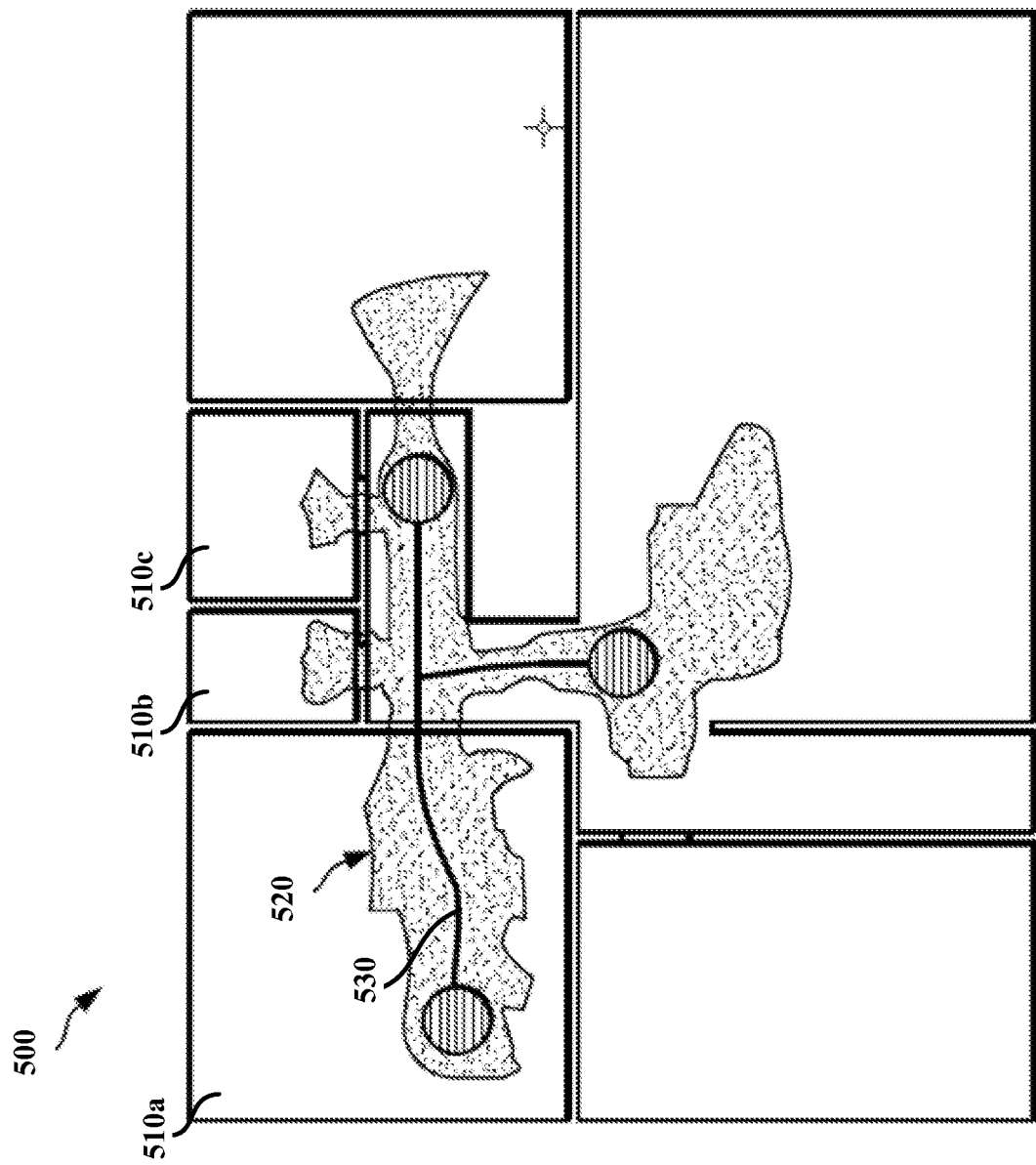
FIG. 5 illustrates an example of automatically detected areas within a physical space that are likely unoccupied by objects, in accordance with particular embodiments.

FIG. 5 illustrates an example of automatically detected areas within a physical space that are likely unoccupied by objects, according to particular embodiments. The physical space 500 shown is a dwelling with multiple rooms (e.g., 510a, 510b, and 510c). A user may walk along a path 530, carrying a sensor device. For example, the user may wear an HMD with external-facing cameras or other types of sensors. As the user walks along the path 530, the sensor device may capture sensor data, such as images. In particular embodiments, the captured images may be processed by a computing system communicatively coupled to the sensor device (e.g., an on-board computing device that is integrated with the HMD or a laptop or mobile device that is wirelessly connected to the HMD). The computing system may detect 3D locations of features of objects captured in the images and determine the occupancy states of 3D spatial regions (e.g., voxels). The occupancy states of the 3D spatial regions may then be used to determine which areas are likely unoccupied and which areas are likely occupied by objects. The shaded area 520 represents "free" areas whose airspaces are likely unoccupied by objects. The "free" areas 520 may be automatically determined according to the embodiments described herein.

In particular embodiments, a map of the determined "free" areas, as well as "occupied" and "unknown" areas, may be used to help users navigate or move within a physical space. This may be particularly useful while the user's vision is blocked by, e.g., an HMD. For example, the map may be used to generate a virtual safety boundary that could be displayed on the HMD to alert the user of his location relative to the safety boundary. For example, if the user is approaching the boundary of "free" areas, a virtual boundary may be rendered based on the relative locations of the boundary and the user. By showing the virtual boundary to the user, he would at least know that he is close to an area whose airspace is likely occupied by objects and avoid moving into the area (or be more cautious when moving in the area). In particular embodiments, the system may also determine whether intruders have entered the "free" areas where the user expects to be safe to move in. For example, after the "free" areas have been determined, the computing system may continue to detect objects in the user's physical surroundings. If the system detects an object (e.g., a person, a dog, a toy, etc.) in the "free" areas, the system may treat it as an intruder and alert the user of the object's presence in the "free" area. For example, the system may render a visual representation of the object (e.g., as a collection of "occupied" voxels, a gradient outline of the object, an avatar, etc.) or generate a directional audible alert to inform the user of the object's presence.

In particular embodiments, the map may be generated by the operating system of an artificial-reality device or an associated system-level service. The map may be provided to any third-party application that is running on the device. For example, a system-level library or API may be provided to a third-party application that allows it to request for the system-generated map of "free" areas. The application may then use the information in any manner desired. For example, the application may use the map to help the user navigate or move within the physical environment while his vision of the physical surroundings is blocked. As another example, the application may render a virtual path that corresponds to the "free" areas and instruct the user to walk along the path. The application may additionally or alternatively render virtual obstacles or hazards (e.g., walls, lava, etc.) that correspond to the "occupied" and/or "unknown" areas to discourage the user from physically entering those areas.

Figure 6:
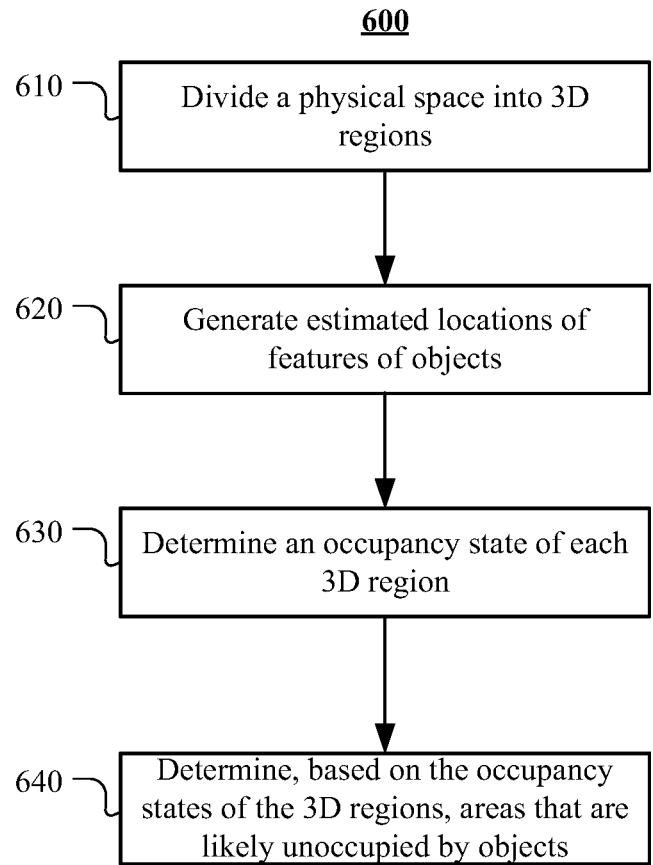
FIG. 6 illustrates an example method for automatically detecting areas that are likely unoccupied by objects, in accordance with particular embodiments.

FIG. 6 illustrates an example method 600 for automatically detecting "free" or "unoccupied" areas. The method may begin at step 610, where a computing system (e.g., one that is associated with a head-mounted device that, when worn by the user, blocks a view of the user of the physical space) may divide at least a portion of a physical space surrounding a user into a plurality of three-dimensional (3D) regions (e.g., voxels or other spatial definitions), where each of the 3D regions may be associated with an area of a plurality of areas in a plane. In particular embodiments, the portion of the physical space may exclude at least one of (1) an upper portion of the physical space above an upper height threshold or (2) a lower portion of the physical space below a lower height threshold.

At step 620, the system may generate estimated locations of features of objects in the portion of the physical space. For example, based on images of the user's surroundings, the system may generate a point cloud based on detectable features of objects captured in the images. Each point in the point cloud may represent the estimated location of a feature.

At step 630, the system may determine, based on the estimated locations, an occupancy state of each of the plurality of 3D regions. In particular embodiments, the occupancy state of each of the plurality of 3D regions may indicate that the 3D region is (1) likely occupied by at least one object (e.g., "occupied") or (2) likely unoccupied by at least one object (e.g., "free"). Additionally, the occupancy state may indicate that a 3D region is "unknown." In particular embodiments, the occupancy state of each of the plurality of 3D regions depends on a number of the estimated locations that are located within that 3D region. For example, each estimated location (or a point in the point cloud) within a 3D region may count as an "occupied" vote. The more "occupied" votes a 3D region has, the more likely it is occupied by at least one physical object. As previously described, an "occupied" vote may be offset by "free" votes. Thus, in particular embodiments, to determine the occupancy state of each of the plurality of 3D regions, the system may further cast rays towards the estimated locations. The occupancy state of each of the plurality of 3D regions depends on a number of the rays that intersect those 3D regions. A ray intersects a 3D region if (1) the ray passes through the 3D region and (2) the estimated location towards which the ray is cast is located outside of the 3D region. Each ray intersection may count as a "free" vote. Thus, if a 3D region receives a total of 5 "occupied" votes and 10 "free" votes, the system may conclude that the 3D region is more likely to be unoccupied by objects. Conversely, if the 3D region receives 5 "occupied" votes and 2 "free" votes, the system may conclude that the 3D region is more likely to be occupied by objects. If a 3D region has no votes or the differential between its "free" and "occupied" votes is insufficient to allow the system to confidently select between the "free" and "occupied" states, the system may deem the state to be "unknown."

At step 640, the system may determine, based on the occupancy states of the plurality of 3D regions, that one or more of the plurality of areas have respective airspaces that are likely unoccupied by objects. This may be determined by, for example, determining that the airspace associated with each of the one or more of the plurality of areas (1) does not contain any 3D region whose occupancy state indicates that the 3D region is likely occupied by at least one object; and (2) contains a threshold number of 3D regions whose respective occupancy states indicates that the corresponding 3D region is likely unoccupied by at least one object. The threshold number of such "free" regions may depend on the number of "unknown" regions so that the "free" regions outnumber the "unknown" regions by a certain amount or percentage of the total number of 3D regions associated with the area (e.g., if there are 100 regions associated with an area, 30%, 50%, or 70% of the regions may need to be "free" in order for the area to be deemed to have an unoccupied airspace). In particular embodiments, the system may further determine that another one or more of the plurality of areas have respective second airspaces that are likely occupied by objects based on a determination that the second airspaces each contains at least one 3D region whose occupancy state indicates that the 3D region is likely occupied by at least one object.

In particular embodiments, the airspace associated with each of the one or more areas is below the upper height threshold, above the lower height threshold, or between the upper height threshold and the lower height threshold. In particular embodiments, the airspace associated with each of the one or more areas is defined by a vertical boundary that extends upwards or downwards from the area. In particular embodiments, each of the plurality of 3D regions is within the airspace of the area associated with that 3D region.

In particular embodiments, the one or more of the plurality of areas are configured to be used by an application to help the user move within the portion of the physical space (e.g., a third-party application, such as a game, may use the information to generate a virtual path or obstacles to guide the user in a virtual environment without running into physical objects). In particular embodiments, the system may provide the one or more of the plurality of areas to a virtual-reality application configured to use the one or more of the plurality of areas to generate a visual indication for guiding movements of the user.

Particular embodiments may repeat one or more steps of the method of FIG. 6, where appropriate. Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for determining areas that are likely to be unoccupied by objects, including the particular steps of the method of FIG. 6, this disclosure contemplates any suitable method for determining areas that are likely to be unoccupied by objects, including any suitable steps, which may include a subset of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
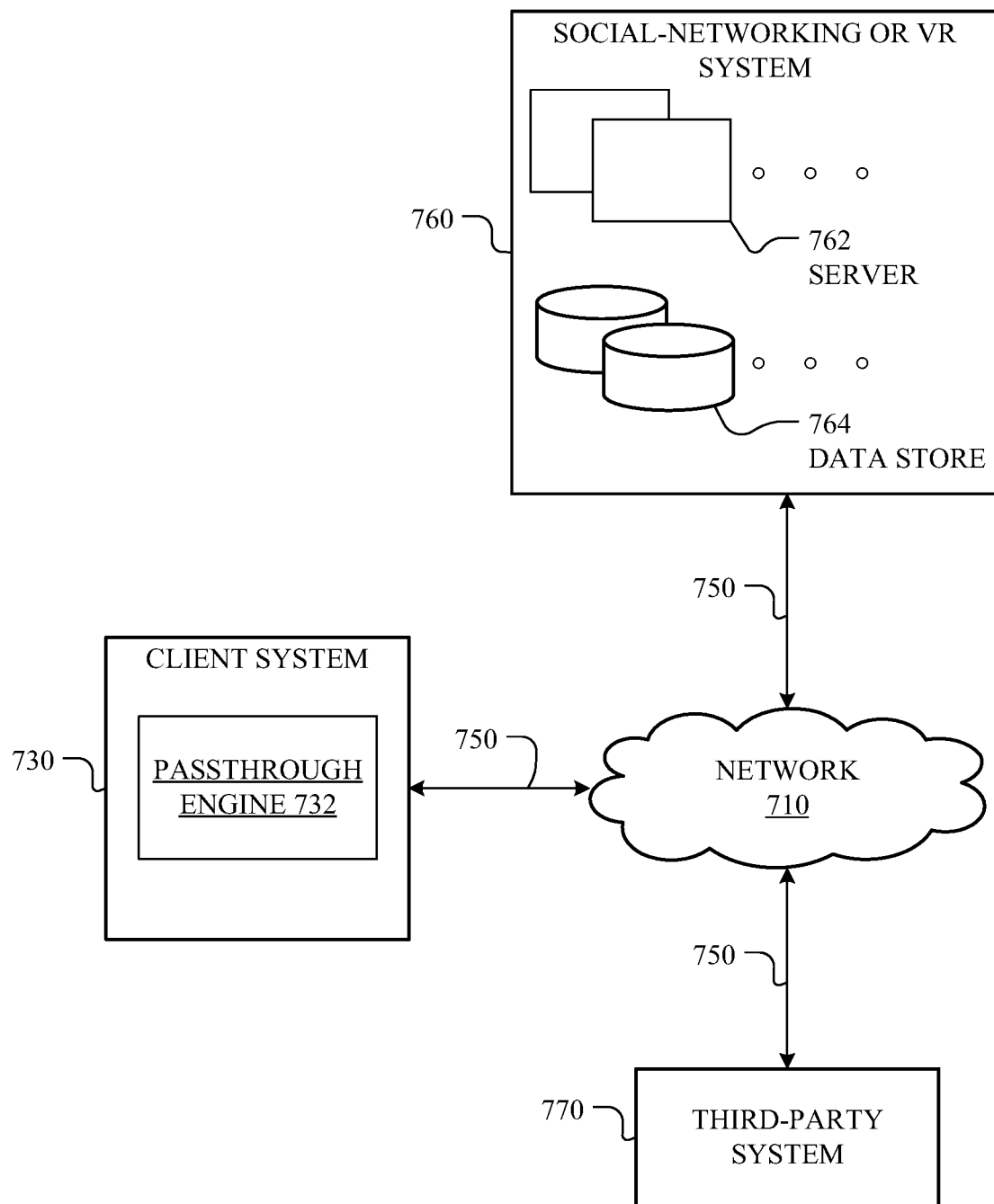
FIG. 7 illustrates an example network environment associated with an AR/VR or social-networking system.

FIG. 7 illustrates an example network environment 700 associated with a VR or social-networking system. Network environment 700 includes a client system 730, a VR or social-networking system 760, and a third-party system 770 connected to each other by a network 710. Although FIG. 7 illustrates a particular arrangement of client system 730, VR or social-networking system 760, third-party system 770, and network 710, this disclosure contemplates any suitable arrangement of client system 730, VR or social-networking system 760, third-party system 770, and network 710. As an example and not by way of limitation, two or more of client system 730, VR or social-networking system 760, and third-party system 770 may be connected to each other directly, bypassing network 710. As another example, two or more of client system 730, VR or social-networking system 760, and third-party system 770 may be physically or logically co-located with each other in whole or in part. Moreover, although FIG. 7 illustrates a particular number of client systems 730, VR or social-networking systems 760, third-party systems 770, and networks 710, this disclosure contemplates any suitable number of client systems 730, VR or social-networking systems 760, third-party systems 770, and networks 710. As an example and not by way of limitation, network environment 700 may include multiple client system 730, VR or social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 (e.g., an HMD) may include a passthrough engine 732 to provide the passthrough feature described herein, and may have one or more add-ons, plug-ins, or other extensions. A user at client system 730 may connect to a particular server (such as server 762, or a server associated with a third-party system 770). The server may accept the request and communicate with the client system 730.

In particular embodiments, VR or social-networking system 760 may be a network-addressable computing system that can host an online Virtual Reality environment or social network. VR or social-networking system 760 may generate, store, receive, and send social-networking data, such as, for example, user-profile data, concept-profile data, social-graph information, or other suitable data related to the online social network. Social-networking or VR system 760 may be accessed by the other components of network environment 700 either directly or via network 710. As an example and not by way of limitation, client system 730 may access social-networking or VR system 760 using a web browser, or a native application associated with social-networking or VR system 760 (e.g., a mobile social-networking application, a messaging application, another suitable application, or any combination thereof) either directly or via network 710. In particular embodiments, social-networking or VR system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking or VR system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable databases. Although this disclosure describes or illustrates particular types of databases, this disclosure contemplates any suitable types of databases. Particular embodiments may provide interfaces that enable a client system 730, a social-networking or VR system 760, or a third-party system 770 to manage, retrieve, modify, add, or delete, the information stored in data store 764.

In particular embodiments, social-networking or VR system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking or VR system 760 may provide users of the online social network the ability to communicate and interact with other users. In particular embodiments, users may join the online social network via social-networking or VR system 760 and then add connections (e.g., relationships) to a number of other users of social-networking or VR system 760 to whom they want to be connected. Herein, the term "friend" may refer to any other user of social-networking or VR system 760 with whom a user has formed a connection, association, or relationship via social-networking or VR system 760.

In particular embodiments, social-networking or VR system 760 may provide users with the ability to take actions on various types of items or objects, supported by social-networking or VR system 760. As an example and not by way of limitation, the items and objects may include groups or social networks to which users of social-networking or VR system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking or VR system 760 or by an external system of third-party system 770, which is separate from social-networking or VR system 760 and coupled to social-networking or VR system 760 via a network 710.

In particular embodiments, social-networking or VR system 760 may be capable of linking a variety of entities. As an example and not by way of limitation, social-networking or VR system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking or VR system 760. In particular embodiments, however, social-networking or VR system 760 and third-party systems 770 may operate in conjunction with each other to provide social-networking services to users of social-networking or VR system 760 or third-party systems 770. In this sense, social-networking or VR system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie showtimes, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking or VR system 760 also includes user-generated content objects, which may enhance a user's interactions with social-networking or VR system 760. User-generated content may include anything a user can add, upload, send, or "post" to social-networking or VR system 760. As an example and not by way of limitation, a user communicates posts to social-networking or VR system 760 from a client system 730. Posts may include data such as status updates or other textual data, location information, photos, videos, links, music or other similar data or media. Content may also be added to social-networking or VR system 760 by a third-party through a "communication channel," such as a newsfeed or stream.

In particular embodiments, social-networking or VR system 760 may include a variety of servers, sub-systems, programs, modules, logs, and data stores. In particular embodiments, social-networking or VR system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking or VR system 760 may also include suitable components such as network interfaces, security mechanisms, load balancers, failover servers, management-and-network-operations consoles, other suitable components, or any suitable combination thereof. In particular embodiments, social-networking or VR system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking or VR system 760 to one or more client systems 730 or one or more third-party system 770 via network 710. The web server may include a mail server or other messaging functionality for receiving and routing messages between social-networking or VR system 760 and one or more client systems 730. An API-request server may allow a third-party system 770 to access information from social-networking or VR system 760 by calling one or more APIs. An action logger may be used to receive communications from a web server about a user's actions on or off social-networking or VR system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking or VR system 760. A privacy setting of a user determines how particular information associated with a user can be shared. The authorization server may allow users to opt in to or opt-out of having their actions logged by social-networking or VR system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
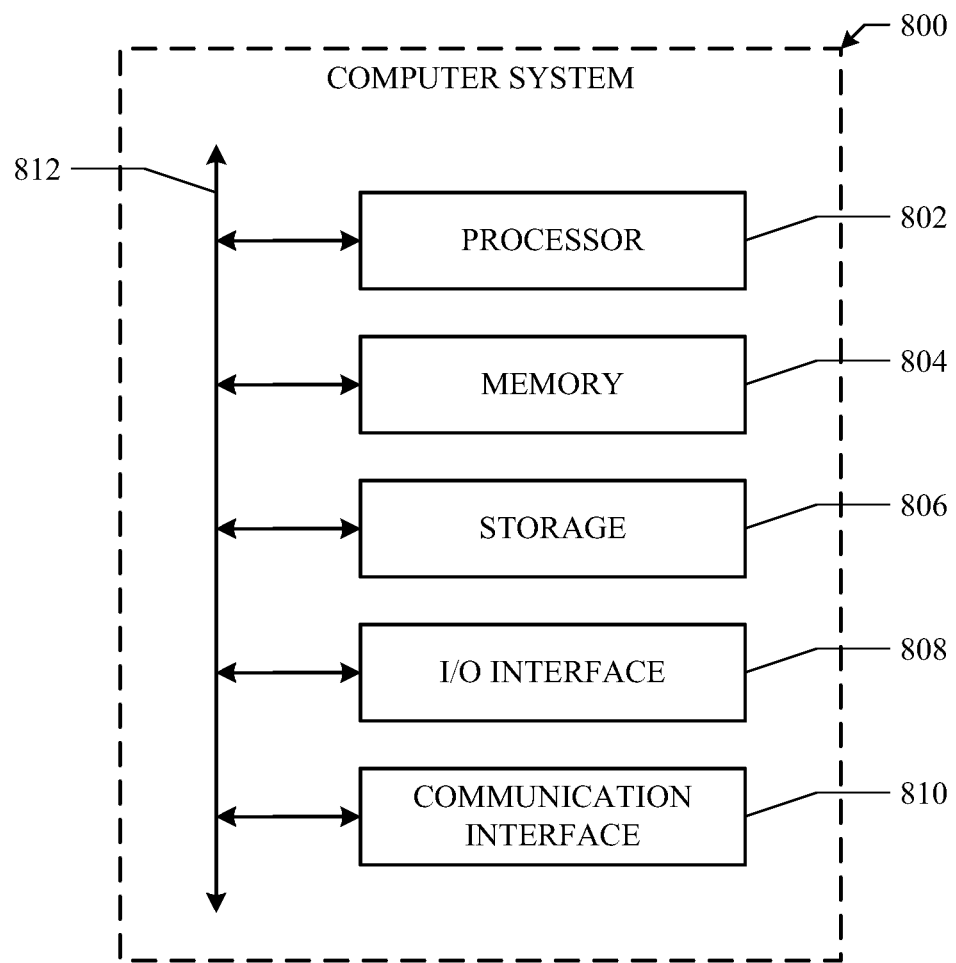
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular

What is claimed is:

1. A method comprising, by a computing system:
   dividing at least a portion of a physical space surrounding a user into a plurality of three-dimensional (3D) regions, wherein each of the 3D regions is associated with an area of a plurality of areas in a plane;
   generating estimated locations of features of objects in the portion of the physical space;
   identifying a region of the physical space corresponding to a floor of the physical space, wherein the region is a horizontal portion starting from the floor to a predetermined threshold distance above the floor;
   filtering the estimated locations by removing one or more of the estimated locations that are located within the identified region;
   determining, based on the filtered estimated locations, an occupancy state of each of the plurality of 3D regions; and
   determining, based on the occupancy states of the plurality of 3D regions, that one or more of the plurality of areas have respective airspaces that are likely unoccupied by objects.

2. The method of claim 1,
   wherein the computing system is associated with a head-mounted device that, when worn by the user, blocks a view of the user of the physical space; and
   wherein the determined one or more of the plurality of areas are configured to be used by an application to help the user move within the portion of the physical space.

3. The method of claim 1, wherein the computing system further filters the estimated locations by removing one or more of the estimated locations that are between a ceiling of the physical space and a second predetermined threshold distance below the ceiling.

4. The method of claim 3, wherein the airspace associated with each of the one or more areas is between an upper height threshold defined by the second predetermined threshold distance below the ceiling and a lower height threshold defined by the first predetermined threshold distance above the floor.

5. The method of claim 1, wherein the airspace associated with each of the one or more areas is defined by a vertical boundary that extends upwards or downwards from the area.

6. The method of claim 1, wherein each of the plurality of 3D regions is within the airspace of the area associated with that 3D region.

7. The method of claim 1, wherein the occupancy state of each of the plurality of 3D regions depends on a number of the estimated locations that are located within that 3D region.

8. The method of claim 7, wherein determining the occupancy state of each of the plurality of 3D regions comprises:
   casting rays towards the estimated locations;
   wherein the occupancy state of each of the plurality of 3D regions depends on a number of the rays that intersect that 3D region.

9. The method of claim 8, wherein a ray intersects a 3D region if (1) the ray passes through the 3D region and (2) one of the estimated locations towards which the ray is cast is located outside of the 3D region.

10. The method of claim 1, wherein the occupancy state of each of the plurality of 3D regions indicates that the 3D region is (1) likely occupied by at least one object or (2) likely unoccupied by at least one object.

11. The method of claim 10, further comprising:
    determining that another one or more of the plurality of areas have respective second airspaces that are likely occupied by objects based on a determination that the second airspaces each contains at least one 3D region whose occupancy state indicates that the 3D region is likely occupied by at least one object.

12. The method of claim 10, wherein determining that the one or more of the plurality of areas have respective airspaces that are likely unoccupied by objects further comprises:
    determining that the airspace associated with each of the one or more of the plurality of areas does not contain any 3D region whose occupancy state indicates that the 3D region is likely occupied by at least one object; and
    determining that the airspace associated with each of the one or more of the plurality of areas contains a threshold number of 3D regions whose respective occupancy states indicates that the corresponding 3D region is likely unoccupied by at least one object.

13. The method of claim 1, further comprising:
    providing the one or more of the plurality of areas to a virtual-reality application configured to use the one or more of the plurality of areas to generate a visual indication for guiding movements of the user.

14. One or more computer-readable non-transitory storage media embodying software that is operable when executed to:
    divide at least a portion of a physical space surrounding a user into a plurality of three-dimensional (3D) regions, wherein each of the 3D regions is associated with an area of a plurality of areas in a plane;
    generate estimated locations of features of objects in the portion of the physical space;
    identify a region of the physical space corresponding to a floor of the physical space, wherein the region is a horizontal portion starting from the floor to a predetermined threshold distance above the floor;
    filter the estimated locations by removing one or more of the estimated locations that are located within the identified region;
    determine, based on the filtered estimated locations, an occupancy state of each of the plurality of 3D regions; and
    determine, based on the occupancy states of the plurality of 3D regions, that one or more of the plurality of areas have respective airspaces that are likely unoccupied by objects.

15. The media of claim 14, wherein the computing system further filters the estimated locations by removing one or more of the estimated locations that are between a ceiling of the physical space and a second predetermined threshold distance below the ceiling.

16. The media of claim 14, wherein the airspace associated with each of the one or more areas is defined by a vertical boundary that extends upwards or downwards from the area.

17. The media of claim 14, wherein the occupancy state of each of the plurality of 3D regions depends on a number of the estimated locations that are located within that 3D region.

18. A system comprising:
    one or more processors; and
    one or more computer-readable non-transitory storage media coupled to one or more of the processors and comprising instructions operable when executed by one or more of the processors to cause the system to:

divide at least a portion of a physical space surrounding a user into a plurality of three-dimensional (3D) regions, wherein each of the 3D regions is associated with an area of a plurality of areas in a plane;

generate estimated locations of features of objects in the portion of the physical space;

identify a region of the physical space corresponding to a floor of the physical space, wherein the region is a horizontal portion starting from the floor to a predetermined threshold distance above the floor;

filter the estimated locations by removing one or more of the estimated locations that are located within the identified region;

determine, based on the filtered estimated locations, an occupancy state of each of the plurality of 3D regions; and determine, based on the occupancy states of the plurality of 3D regions, that one or more of the plurality of areas have respective airspaces that are likely unoccupied by objects.

19. The system of claim 18, wherein the computing system further filters the estimated locations by removing one or more of the estimated locations that are between a ceiling of the physical space and a second predetermined threshold distance below the ceiling.

20. The system of claim 18, wherein the airspace associated with each of the one or more areas is defined by a vertical boundary that extends upwards or downwards from the area.

* * * * *